United States Patent
Nichols

(10) Patent No.: US 9,426,972 B2
(45) Date of Patent: Aug. 30, 2016

(54) SELF HOOK SETTING ROD HOLDER

(71) Applicant: Shaun Ray Nichols, Soldotna, AK (US)

(72) Inventor: Shaun Ray Nichols, Soldotna, AK (US)

(73) Assignee: AK Salmon Bear, LLC, Wasilla, AK (US)

( * ) Notice: Subject to any disclaimer, the term of this patent is extended or adjusted under 35 U.S.C. 154(b) by 82 days.

(21) Appl. No.: 14/568,558

(22) Filed: Dec. 12, 2014

(65) Prior Publication Data
US 2016/0165870 A1 Jun. 16, 2016

Related U.S. Application Data

(60) Provisional application No. 61/915,374, filed on Dec. 12, 2013.

(51) Int. Cl.
- *A01K 97/12* (2006.01)
- *A01K 97/11* (2006.01)
- *A01K 97/01* (2006.01)

(52) U.S. Cl.
CPC .............. *A01K 97/11* (2013.01); *A01K 97/01* (2013.01); *A01K 97/12* (2013.01)

(58) Field of Classification Search
USPC ................................ 43/15, 16, 4.5
See application file for complete search history.

(56) References Cited

U.S. PATENT DOCUMENTS

| | | | | |
|---|---|---|---|---|
| 3,154,875 A * | 11/1964 | Biddison | A01K 97/11 | 43/15 |
| 3,456,377 A * | 7/1969 | Niles | A01K 97/11 | 43/15 |
| 4,193,220 A * | 3/1980 | Bourquin | A01K 91/10 | 43/15 |
| 4,217,719 A * | 8/1980 | McDonnell | A01K 97/11 | 43/15 |
| 5,050,332 A * | 9/1991 | Cross | A01K 97/11 | 43/15 |
| 5,076,001 A * | 12/1991 | Coon | A01K 97/11 | 43/15 |
| 5,890,312 A * | 4/1999 | Ball | A01K 97/01 | 43/15 |
| 6,050,020 A * | 4/2000 | Sizemore | A01K 97/11 | 43/15 |
| 6,336,287 B1 * | 1/2002 | Lobato | A01K 97/11 | 43/15 |
| 7,716,867 B2 * | 5/2010 | Dungan | A01K 91/065 | 43/15 |
| 8,567,108 B1 * | 10/2013 | Babbs | A01K 97/11 | 43/15 |
| 2008/0134563 A1 * | 6/2008 | Gunter | A01K 97/11 | 43/16 |
| 2015/0245601 A1 * | 9/2015 | Herzog | A01K 97/11 | 43/15 |

* cited by examiner

*Primary Examiner* — Christopher P Ellis
(74) *Attorney, Agent, or Firm* — Haffey Vap PLLC; John F. Haffey; Mitchell J. W. Vap

(57) ABSTRACT

An automatic hook setting rod holder is comprised of a flat base supporting a rod holder that rotates vertically upward when a fish strikes a hook, thereby setting the hook. A torsion spring and bar assembly lies under the rod holder and is held in a pre-strike position by a trigger rod. The trigger rod is connected to the base and has a bearing surface to hold the loaded torsion spring and bar assembly in a pre-strike position. The trigger rod has a bent end to receive and hold the fishing line before a fish strike. Once a fish strikes, tension on the fishing line pulls and rotates the trigger rod away from the torsion spring and bar assembly, thereby releasing it and causing it to contact the rod holder, which in turn causes it to rotate upward and sets the hook in the fish's mouth.

12 Claims, 4 Drawing Sheets

SELF HOOK SETTING ROD HOLDER

CROSS-REFERENCE TO RELATED APPLICATIONS

This application claims the benefit of U.S. Provisional Application No. 61/915,374 filed Dec. 12, 2013, the disclosure of which is incorporated herein by reference.

FIELD OF THE INVENTION

The present invention relates to a self setting quick release rod holder that automatically sets a fishing hook in a fish's mouth upon a fish strike, thereby reducing the chance a fish will completely swallow a hook and allow for non-lethal release.

BACKGROUND OF THE INVENTION

Various rod holders and automatic hook setting devices have been used by anglers to aid in efficient fishing, especially through ice. Most devices are overly complex, cumbersome, and do not allow the angler to easily retrieve the rod so the angler can fight and reel in the fish with the rod and reel. Rather once the fish is hooked, the angler typically needs to retrieve the line and fish by hand. That process leads to cuts on the hand and damaged fishing line. In addition, those devices are not easily used by handicapped or elderly anglers.

The present invention incorporates an easy to set up fishing rod holder that uses a torsion spring to rotate the fishing rod upward once the trigger holding the torsion spring in place is released by fishing line tension caused by a fish strike, which then sets the hook.

SUMMARY OF THE INVENTION

The invention is a quick-release rod holder and automatic hook setting system wherein a fish strike pulls on a trigger bar and releases a torsion spring, which in turn rotates the rod holder upwardly thereby setting the hook in the fish's mouth. The invention comprises a flat base having a front end and back end, which is made of suitable rigid material such as wood, plastic, composites or metal. A tubular rod holder having a front and back end is connected to the base proximate to the back end by a hinged attachment means, such as "L" brackets with a bolt or other pin running through the brackets and rod holder, which allow the rod holder to vertically rotate. Beneath the rod holder is a torsion spring and bar assembly, commonly known as a hinge spring or "mousetrap" spring, and configured like a classic mousetrap design, that is secured to the base with attachment means, and having a rotating side with a bearing bar to make contact with the rod holder. When in the collapsed position, the rotating side is directed to the back end of the base, but rotates toward the front end of the base when the system is set, which in turn loads the spring. A trigger bar having a hooked end a bent end and a bearing surface is used to set the torsion spring and bar assembly in a pre-strike position. The hooked end of the trigger bar is attached to an eye screw that is in turn attached to the base in front of the torsion spring assembly, and offset from the horizontal centerline of the base so it runs essentially perpendicular to the base, but to one side of the rod holder. Proximate to the hooked end of the trigger bar is a generally right angle bend toward the rear end of the base, which is to provide a bearing surface for holding the torsion and bar assembly in a set position. A reverse generally right angle bend then leads to the bent end of the trigger bar. The bent end of the trigger is made to receive and hold in place the fishing line when the invention is in a set position by having a "V" shaped bend opened toward the back of the device. Finally a catch hook is made by securing a hook bolt through the rod holder in front of the pole holder attachment means. The hook is placed under the rod holder with its hook opening directed toward the front of the device for catching and securing the rotating side of the torsion spring and bar assembly once the device is triggered from a fish strike.

Accordingly, the object of the invention is to provide a rod holder and automatic hook setter that is triggered when a fish strikes the hook, causing the trigger bar to release the torsion spring and bar assembly, which in turn causes the rod holder to quickly rotate upward and set the hook in the fish's mouth. The angler can then quickly remove the rod and fight and reel in the fish.

DESCRIPTION OF PREFERRED EMBODIMENT

Figure 1:
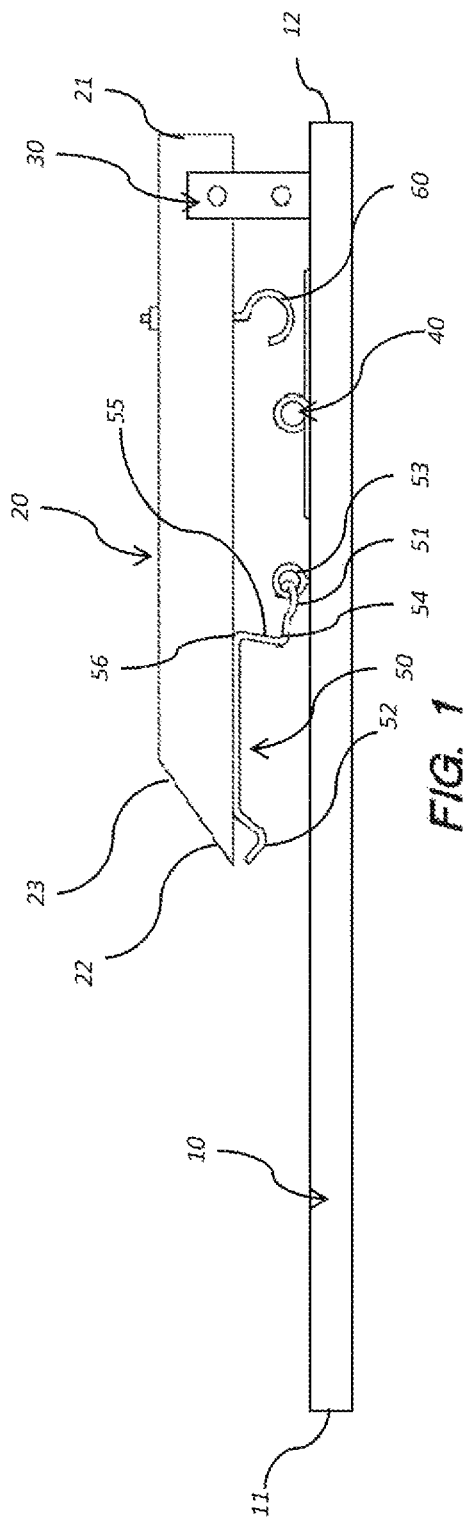
FIG. 1 is a side view of the invention is a collapsed, pre-set, position.
Figure 2:
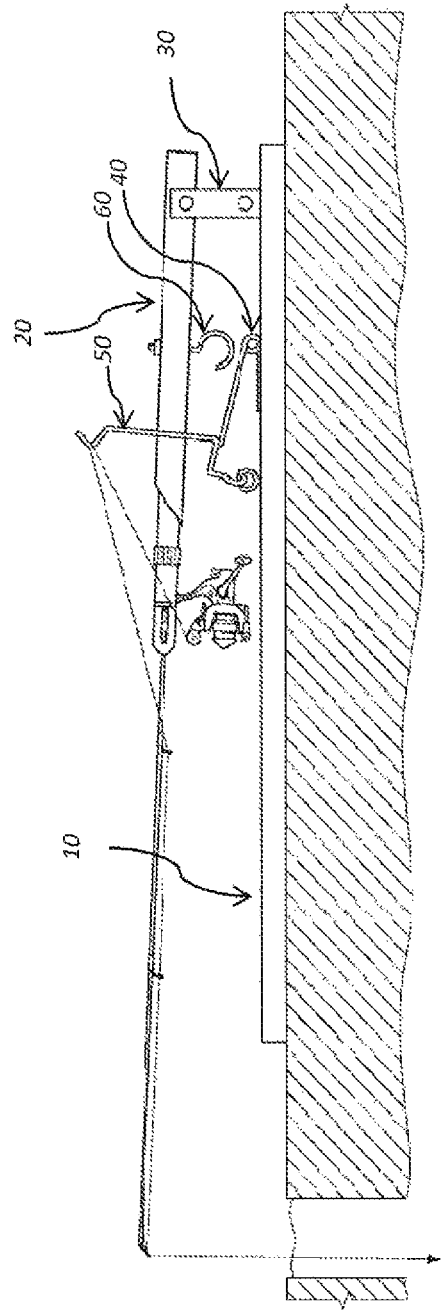
FIG. 2 is a side view of the invention with a rod in the rod holder and in a loaded, trigger set position.
Figure 3:
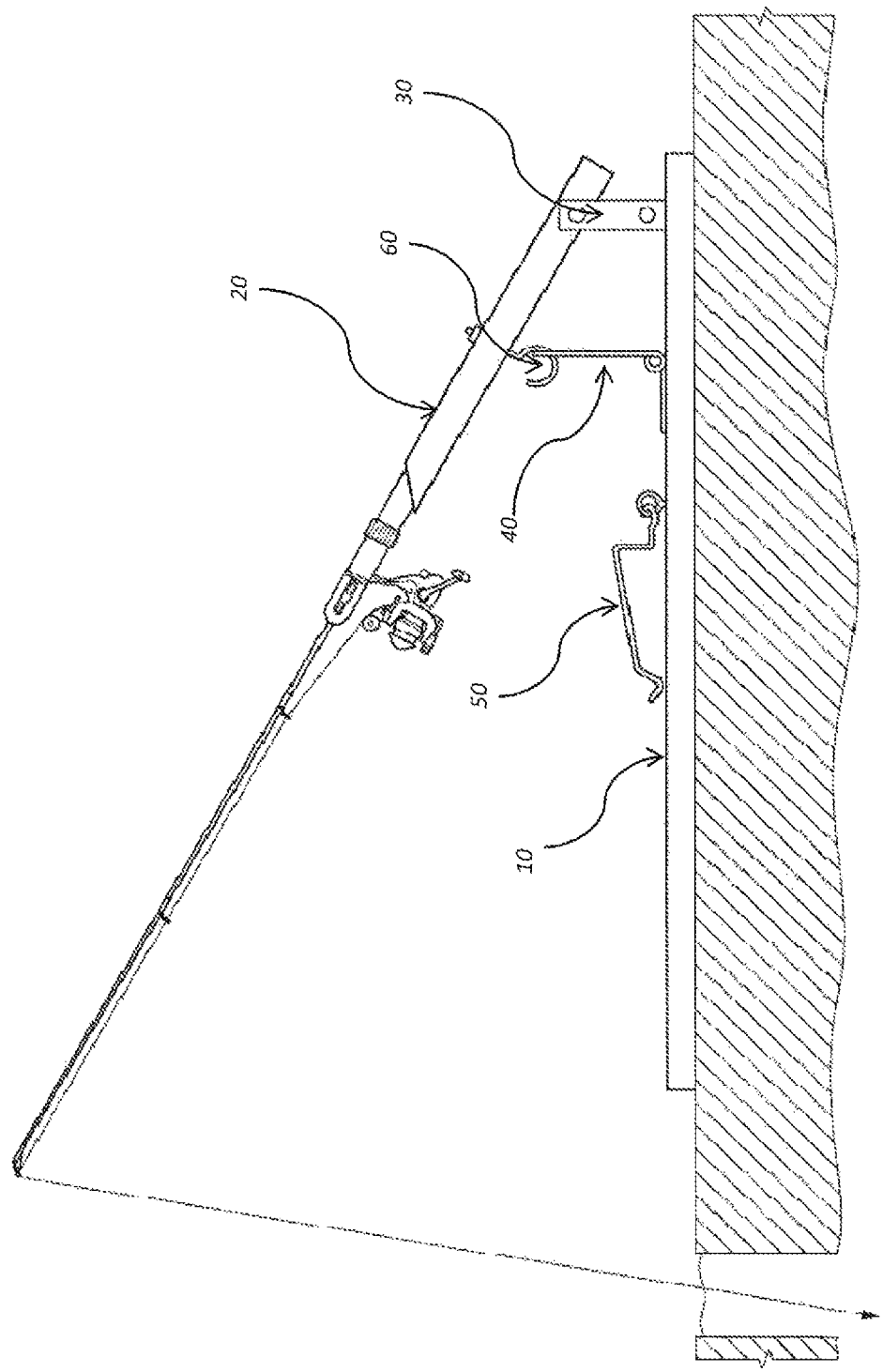
FIG. 3 is a side view of the invention with the rod in the holder and the trigger released showing the rod holder rotated upwardly and the bearing bar of the torsion spring and bar assembly secured by the catch hook.

Although only one embodiment is explained in detail, it is to be understood as an illustration only, and not intended to limit the invention in its scope. Also, in describing the embodiment specific terminology may be used, but it should be understood that specific terms include all technical equivalents that operate in similar manners to accomplish similar purposes.

With reference to the drawings, a preferred embodiment of this invention is illustrated in FIGS. 1-5. The device generally comprises a rigid flat base 10, a rod holder 20, a rod holder attachment means 30, a torsion spring and bar assembly 40, a trigger bar 50, a catch hook 60, and a rod rest 70.

Figure 4:
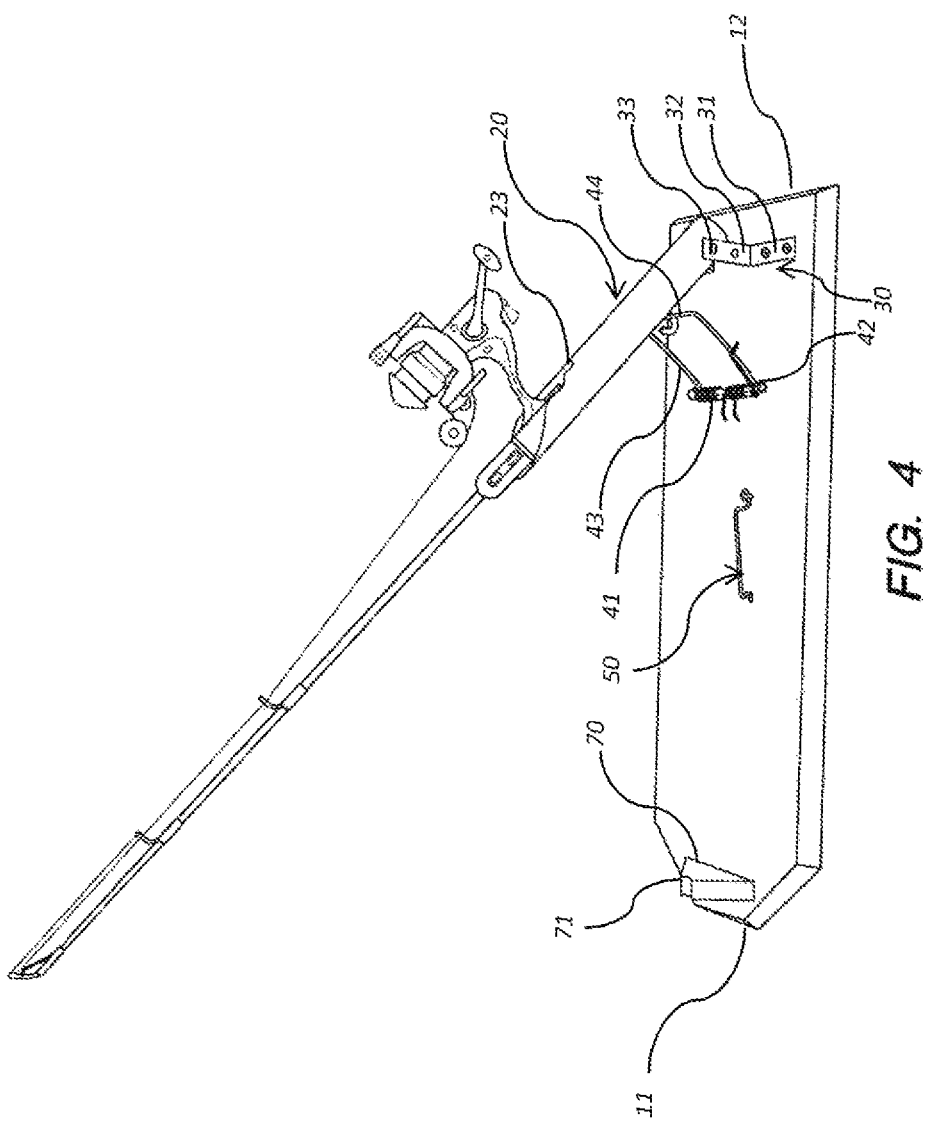
FIG. 4 is a perspective view of the invention after it has been triggered.
Figure 5:
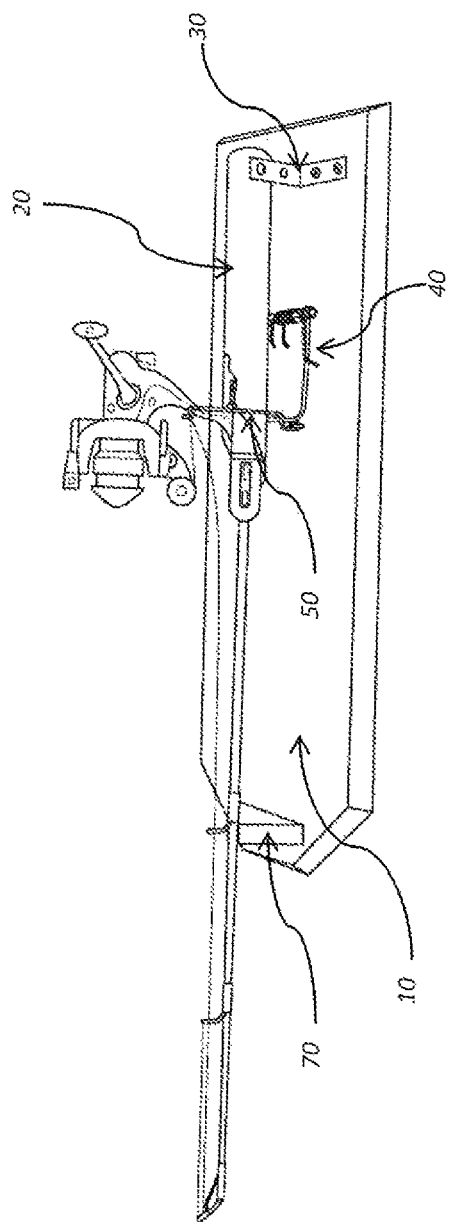
FIG. 5 is a perspective view of the invention in a pre-strike, trigger set position and showing the front rod rest.

The rigid flat base 10, is generally a rectangular flat board having a front end 11 and a back end 12, which are the short sides of the base. The rod holder 20 is tubular and has a back end 21 and a front end 22, which in turn is has a cut back top 23 to provide a slot for fishing reel placement, as can be seen in FIG. 4. As can also be seen in FIG. 4, the rod holder attachment means 30, comprises two "L" brackets positioned on each side proximate to the back end of the rod holder, and wherein the horizontal members of the brackets 31 are secured to the base proximate to the back end of the base 12 and the vertical members of the brackets 32 provide for a bolt 33 to pass through the brackets and the rod holder to create a pivot point for the rod holder, allowing it rotate vertically from the base. The torsion spring and bar assembly 40 uses helical torsion springs 41 around a center bar 42 that is attached to the base and also hinged to a squared "U" shaped rotating bar 43 that provides a bearing surface for contact with the rod holder 44, which lies flat on the base and is directed to the back end of the base when in a pre-set position. The rotating bar 43 and 44 rotate toward the front of the base around the center bar 42 to set and load the spring. Referring to FIG. 1, the trigger bar 50 has a hooked end 51 and a "V" bent end 52, wherein the hooked end is connected to an eye screw 53, that in turn is secured to the base in front of the torsion spring and bar assembly 40, and to one side of the rod holder. Proximate to the hooked end is a bend 54, generally at a right angle, directed toward the back of the device giving the trigger bar a bearing surface 55, which is to hold the rotating end of the torsion bar in a set position. The trigger bar then has a reverse bend 56, generally at a right angle, which brings the trigger bar to back to a general vertical alignment when in the set position, and continues to the V bent end of the trigger bar 52, which is to hold in place the fishing line in a pre-strike position. The catch hook 60 is a hook bolt that is secured through the rod holder and positioned between the rod holder attachment means 30 and the helical springs of the torsion spring and bar assembly 40. The hook is placed on the underside of the rod holder with its hook opening facing the front of the device. Once the trigger bar is released, the torsion bar will be stopped and secured by the hook. Finally a rod rest 70 is attached proximate to the front end of the base 11, which is a vertical member containing a saddle on the top surface 71 to hold the rod in place in a pre-strike position, as illustrated in FIGS. 4 and 5.

I claim:

1. A self hook setting rod holder comprising:
    a flat base having a front end and a back end, wherein the lengths of the front end and back end are shorter than the lengths of the sides;
    a tubular fishing rod holder having a front end and a back end;
    a rod holder attachment means that is rigidly attached to the base proximate to the back end of the base, and attached proximate to the back end of the rod holder through use of a pin running through the rod holder, thereby allowing the rod holder to rotate vertically with respect to the base;
    a torsion spring and bar assembly positioned beneath the rod holder, and having helical torsion springs around a center bar that is attached to the base with attachment means, wherein the helical torsion springs are connected to a rotatable squared "U" shaped bar having a bearing surface for contact with the rod holder, and is directed toward the back end of the base when in a pre-set position, and rotates toward the front under tension from the helical torsion springs when being set;
    a trigger rod having a hooked end, a V bent end and a bearing surface between the ends; wherein the hooked end is attached to an eye secured to the base and the bent end holds in place fishing line in a pre-strike position, and the bearing surface holds the rotating side of the torsion spring and bar assembly in a pre-strike position; and
    a catch hook secured to the rod holder, wherein the hook is placed beneath the rod holder with the hook opening faced toward the front of the rod holder, which acts to receive and hold the rotatable bar of the torsion spring and bar assembly after a fish strike.

2. The self hook setting rod holder of claim 1, wherein the rod holder attachment means comprises two "L" brackets on each side of the back end of the rod holder, and where the horizontal legs of the brackets are fastened to the base with screws, and the rod holder is attached between the vertical legs of the brackets using a head bolt passing through the brackets and rod holder and secured with a nut.

3. The self hook setting rod holder of claim 2, wherein the front end of the rod holder is cut back on the top to provide a slot for accepting a reel on a fishing rod.

4. The self hook setting rod holder of claim 3, wherein the rod holder is made from 1" nominal PVC pipe and having 10.5" length.

5. The self hook setting rod holder of claim 3, wherein the rod holder is made from 1.5" nominal PVC pipe and having 10.5" length.

6. The self hook setting rod holder of claim 3, wherein the rod holder is made from 2" nominal PVC pipe and having 10.5" length".

7. The self hook setting rod holder of claim 3, wherein the rod holder is made from 2.5" nominal PVC pipe and having 10.5" length".

8. The self hook setting rod holder of claim 3, wherein the rod holder is made from 3.0" nominal PVC pipe and having 10.5" length".

9. The self hook setting rod holder of claim 1, further comprising a rod rest attached to the base proximate to the front end of the base, wherein the rod rest rises vertically and contains a cradle cut into its top surface where the rod rests.

10. The self hook setting rod holder of claim 1, wherein the base is constructed from ¾" thick plywood.

11. The self hook setting rod holder of claim 1, wherein the base is constructed from ½" thick polyethylene.

12. The self hook setting rod holder of claim 1, wherein all hardware is made from corrosion resistant materials.

* * * * *